Patented Mar. 17, 1936

2,033,923

UNITED STATES PATENT OFFICE 2,033,923

ARTICLE OF MANUFACTURE AND METHOD OF MAKING THE SAME

Simon Collier, Waukegan, Ill., assignor to Johns-Manville Corporation, New York, N. Y., a corporation of New York No Drawing. Application October 28, 1932, Serial No. 640,135

4 Claims. (Cl. 106—23)

This invention relates to an article of manufacture, particularly an article adapted for use as friction material, and the method of making the same.

The invention comprises the novel features hereinafter described and claimed and, especially, an article adapted for use as automotive brake lining or clutch facing, for example. Such an article includes discrete fibers which, preferably, are oriented into predominantly parallel relationship, a heat-resistant, inorganic coating intimately associated with the fibers, as by precipitation thereon, and a binder disposed between and enclosing the coated fibers and adhering them into a unitary product. In the preferred embodiment, the invention comprises discrete asbestos fibers intimately associated with calcium silicate or the like, precipitated in situ, and dispersed, in predominantly parallel relationship, in a semiplastic binder that is impermeable to water and that adheres the coated fibers into a resilient article. The invention comprises also the method of making an article of the type described, which method includes mixing discrete asbestos fibers or the like with a slightly soluble substance adapted to produce a precipitate with a second substance added later, adding the second substance in form adapted to produce a precipitate with the said first substance, converting the mixture of fibers and precipitate into a condition suitable for blending with the selected binder adapted to be hardened, blending with the said binder, preferably on sheeter rolls, converting the blended product to form desired, and hardening the binder therein.

The invention will be illustrated by the example of making an improved brake lining from asbestos fibers, calcium silicate intimately associated with the fibers, and a rubber binder.

There is first provided a supply of asbestos fibers. A selected quantity of these fibers, in loose, fluffy condition, are placed in a suitable mixing device, say in a tumbler. To this selected quantity of fibers, there is added dry, finely divided hydrated lime in the proportion of 5 to 60, but suitably approximately 15 parts, by weight of the lime to 100 parts of the fibers. After the two materials have been mixed thoroughly with each other and, suitably while still being tumbled, an aqueous solution of silicate of soda is sprayed onto the mixture within the tumbler. The solution used may be of density 21° Bé. and in amount that may be varied considerably but is, suitably, less than equivalent chemically to the lime initially added, say, a weight of solution equal to that of the lime. After thorough mixing and allowance of adequate time for the lime, which was initially lodged within and around the asbestos fibers and distributed substantially uniformly with respect thereto, to react with the sodium silicate, the mixing is discontinued and the product, consisting now of asbestos fibers, calcium silicate, and by-product sodium hydroxide, in intimate association with the asbestos fibers, is subjected to treatment to render it suitable for blending with a binder, say, to drying. Thus, the wet mixture may be placed in shallow trays and dried at approximately 150 to 250° F. The dried fiber is then in condition to receive the selected binder material.

The preferred binder material is a rubber friction compound. In addition to raw rubber, the compound may contain, for example, a vulcanizing agent, an anti-oxidant, a filler, a pigment, and/or other ingredients that are conventionally used in rubber compounds for impregnating asbestos products in making friction elements.

The rubber compound or binder material may be incorporated into the silicated fibers as described in U. S. Patent 1,877,651, issued to Eisenhardt on September 13, 1932. Thus, the rubber compound may be applied in the form of a cement or solution in a volatile solvent, such as gasoline. The initial mixing may be made in any suitable mixer, as, for example, in one provided with a rotary agitator. After the initial mixing is completed, the resulting mixed material, containing rubber compound, volatile solvent, asbestos fibers, and calcium silicate precipitated in intimate association with the fibers, is transferred to sheeter rolls, one of which is warm. On these rolls the incorporation of the binder into the silicated fibers is made thorough, the volatile solvent is largely evaporated, the product is shaped into sheet form, the fibers are oriented into predominantly parallel relationship, and the rubber binder may be partially vulcanized. The product thus formed into a sheet may be cut to approximate size desired, submitted to shaping within dies or between heated plates and to further vulcanization of the rubber therein, all as described in the said patent to Eisenhardt.

The product so made has a number of interesting features.

As stated, the fibers are oriented into predominantly parallel relationship and are discrete, as distinguished from their condition in a felted, woven, or spun product. The water-impermeable binder is disposed between and encloses a large proportion, usually substantially all, of these discrete fibers, in such manner as to prevent access of moisture to the fibers.

A typical product contains the products of the interaction, in the presence of water, of 100 parts by weight of asbestos, 15 parts of hydrated lime and 2.5 parts of sodium silicate, on the dry basis, and 15 parts of rubber compound. It will be noted that the inorganic content should be expected to be alkaline; there is an excess of lime over that equivalent chemically to the sodium silicate added and also the by-product of the reaction, sodium hydroxide, is allowed to remain, associated with the asbestos. There is recognized the complexity of the reaction of the lime and soluble silicate, in the proportions given, in the presence of asbestos and of the relation of the products of the reaction to the rubber subsequently added. It is not necessary to the invention to advance a theory of explanation.

The product has outstanding advantages when used as brake lining. For example, a brake lining made as described, was worn away to a depth of 0.017 inch during 100 tests under very severe conditions, as compared to a wear of 0.070 to 0.100 inch that is normally experienced with sheeter linings made similarly but without the calcium silicate or other heat-resistant inorganic substance associated with the reenforcing fibers. Furthermore, this brake lining containing the calcium silicate precipitated in situ is adapted to withstand braking of an automobile at an initial speed of 60 miles per hour, with a deceleration of 16 feet per second. In fact, such a lining has been found to withstand more than 100 of such severe tests. Also, the improved lining has a higher coefficient of friction and a greater resistance to the elevated temperatures prevailing in brake linings under severe conditions of use, than other lining, say, of the type described in the said patent to Eisenhardt.

For the materials given above, various alternatives may be substituted, although the materials described give outstanding results and are preferred at this time.

Other fibers, as, for example, wool or shredded leather may be mixed with the asbestos or used alone, if resistance to heat is not required in the finished product and the very intimate association of calcium silicate or the like with the fibers is not necessary.

Silicates of lead, zinc, and/or alkaline earth metals other than calcium may be precipitated on the fibers. In such a case, it is desirable to lodge within or on the fibers a compound of the type of lime, that is, a relatively insoluble compound of the metal whose silicate is later to be precipitated. This initial lodging of the one substance minimizes its migration when water is later added to the mixture, and ensures that the final precipitate shall be intimately associated with the fibers, possibly in part between the microscopic elongated crystals that lie together in bundles composing the individual fibers of asbestos. Thus, lead may be added in the form of finely ground lead chloride. After the one substance is lodged on the fibers, there is then added the second substance. Thus, there is applied a compound of the type of sodium silicate, that is, a compound adapted to produce a precipitate with the substance initially associated with the fibers, say an aqueous solution of a soluble silicate or phosphate such as one of sodium or potassium.

In order to make certain that the solution of precipitant, when added, may penetrate within the fibers and have access to the substance previously associated with the fibers, it is desirable that the substance first added should be added in dry form. If the first substance be added in wet form, then the fibers collapse or mat together in such manner as to make unsatisfactory penetration by the aqueous solution of precipitant added later.

In general, the compound that is associated with the asbestos fibers, as by precipitation or deposition thereon, should be heat-resistant, inorganic, finely divided, and durable under the conditions of use. In brake lining, the precipitated material should be such as to increase the resistance to wear and the coefficient of friction. It is desirable, also, that the precipitate should be water-insoluble, although this is not essential for all purposes, particularly when the binder is water-impermeable and surrounds and seals the fibers with the associated inorganic material. Lime is an example of the preferred type of compound initially intimately associated with the fibers and the water-soluble silicate is an example of the type of compound later added, to cause precipitation.

After the inorganic substance is associated with the fibers, say as described above, the product is rendered or placed in condition suitable for penetration and coating with the binder. Thus, when the binder is added in form that is immiscible with water, the product made as described above is subjected to a draining and drying operation, to remove the water and leave a dried product.

The dried product is then incorporated with the binder. Binders other than a rubber compound that may be used include polymerized chloro-2-butadiene-1,3, of the formula, $CH_2:CCl.CH:CH_2$, herein referred to as chloroprene, and made as described by Carothers and others in the Journal of the American Chemical Society, vol. 53, pages 4203-6, 1931. In the incompletely polymerized state in which it is initially used, the binder has a consistency approximating that of raw rubber.

Another binder that may be used is a drying oil adapted to be hardened, as, for example, by polymerization and/or oxidation. Such a one is Chinawood oil or linseed oil. When the binder used is chloroprene, the final hardening of the mixture is effected at an elevated temperature adapted to polymerize chloroprene to a hardness similar to that of vulcanized rubber. When a drying oil is used, as the binder or impregnating material, the final hardening may include maintenance at an elevated temperature in the presence of an oxidizing atmosphere adapted to cause polymerization and/or oxidation of the oil to a plastic or semi-rigid consistency. In general, the binder used in making a friction or packing element should be adapted to adhere the other ingredients into a product that is resilient after the binder therein is cured or hardened. The binder itself may be semi-plastic initially and resilient after the said curing or hardening.

The term "coating", as used in the claims in connection with fibers, includes not only material on the outside of the fibers but also material lodged therewithin. Precipitated material distributed throughout the fibers, as described, is particularly effective as a wear-resisting agent.

The details that have been given are for the purpose of illustration and not restriction, and many variations therefrom may be made without departing from the spirit and scope of the invention.

What I claim is:

1. In making an article of manufacture comprising discrete fibers, a heat-resistant precipitate therein and a binder adhering the whole into a unitary product, the method which comprises intimately mixing discrete fibers with an undissolved and only slightly soluble substance, then mixing therewith the other of the said substances in form adapted to produce a precipitate with the substance first mixed with the fibers, rendering the mixture of the fibers and precipitate suitable for blending with a binder adapted to be hardened, blending the resulting mixture with the binder, converting the blended product to form desired, and hardening the binder therein.

2. In making an article of manufacture comprising discrete fibers oriented into predominatingly parallel relationship, a heat-resistant coating precipitated, by the interaction of two inorganic substances, in intimate association with the fibers, and a binder adhering the whole into a unitary product, the method which comprises intimately mixing the fibers with one of the said substances in dry, finely divided, relatively insoluble form, then mixing therewith the other of the said substances in aqueous solution, whereby precipitation is produced, drying the mixture containing fibers and precipitate, and then blending into the dried mixture, a binder adapted to be hardened, converting the blended product to form desired, and hardening the binder therein.

3. In making an article of manufacture comprising discrete fibers, a heat-resistant precipitate therein, and a binder adhering the whole into a unitary product, the method which comprises intimately mixing the fibers with an undissolved and only slightly soluble substance, then mixing therewith the other of the said substances in form adapted to produce a precipitate with the substance first mixed with the fiber, drying the mixture of the fibers and precipitate, and then blending the dried mixture with a rubber compound dispersed in a volatile solvent for rubber, forming the blended mixture into a sheet and orienting the fibers therein into predominantly parallel relationship, removing volatile solvent by evaporation, shaping the sheet, and vulcanizing the rubber therein.

4. In making an article of manufacture comprising asbestos fibers, a heat-resistant precipitate therein, and a binder adhering the whole into a unitary product, the method which comprises forming a mixture of asbestos fibers with undissolved lime, sodium silicate in amount less than equivalent chemically to the lime, and water, drying the mixture, incorporating rubber binder compound thereinto, shaping the resulting product, and vulcanizing the rubber therein.

SIMON COLLIER.